Feb. 3, 1942.    J. REBHAN    2,271,890
SURGE VOLTAGE PROTECTION FOR ELECTRICAL APPARATUS
Filed June 1, 1940
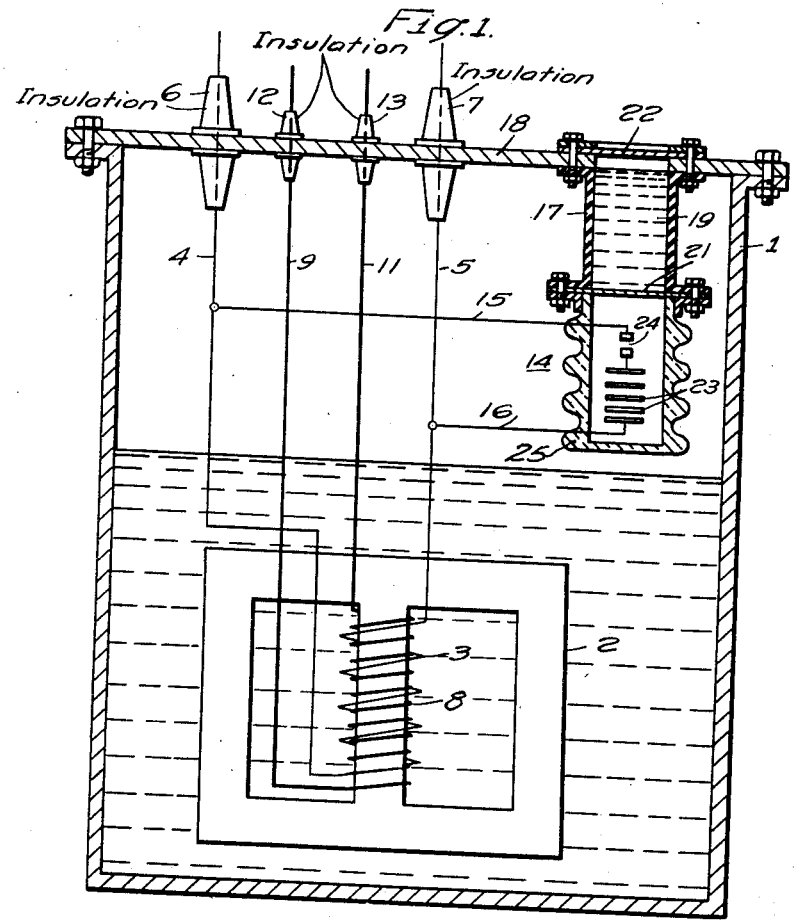
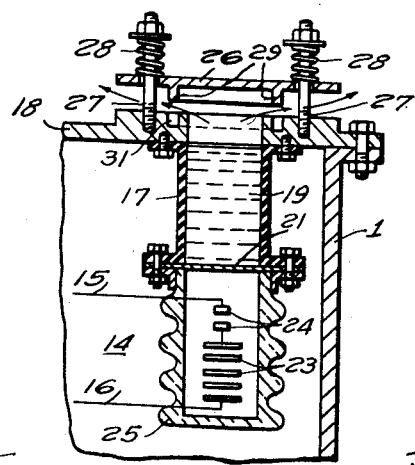
WITNESSES:
INVENTOR
Joseph Rebhan
BY
ATTORNEY Patented Feb. 3, 1942

2,271,890

UNITED STATES PATENT OFFICE 2,271,890

SURGE VOLTAGE PROTECTION FOR ELECTRICAL APPARATUS

Joseph Rebhan, Nuremberg, Germany, assignor to Westinghouse Electric & Manufacturing Company, East Pittsburgh, Pa., a corporation of Pennsylvania Application June 1, 1940, Serial No. 338,364
In Germany May 3, 1939

7 Claims. (Cl. 175—294)

This invention relates to protective equipment for electrical apparatus, such as transformers, by the use of cathode drop or auto-valve lightning arresters.

It is common practice to provide cathode drop arresters or electrical discharge devices in parallel circuit relation with transformer windings or portions thereof to limit the voltage drop that may be developed thereacross by a voltage surge. Such devices have been mounted on the outside of the transformer tank, thus requiring relatively expensive bushings for the leads connecting the terminals of the protective device to the winding being protected, and also adding a considerable height to the transformer structure, especially when the operating voltage is relatively high. Such construction also requires an appreciable length of connecting conductors between the protective device and the tapped points on the transformer winding to which it is connected, which conductors have an appreciable resistance.

Cathode drop discharge devices, when used in the manner described, have a certain potential to ground and, for this reason, must be insulated from the transformer casing which is normally at ground potential. This is done in accordance with the present invention by inserting between the cathode drop discharge device and the transformer casing, a tubular supporting wall of insulating material forming an enclosure in which is contained a column of oil or equivalent insulating fluid. Under normal operating conditions, this column of insulating fluid, together with the surrounding wall of solid insulating material, provides the required insulation between the discharge device and the casing. The side of the enclosure remote from the cathode drop discharge device is provided with an aperture leading to the atmosphere exterior to the transformer casing and is normally closed by a flexible or movable valve member that is adapted to permit the enclosure to be opened to the atmosphere upon generation of gases within the enclosure, which might occur in the case of failure of the cathode drop discharge device. The column of liquid insulating material provided within the enclosure, therefore, serves both as an insulating medium between the electrical discharge device and the casing of the apparatus, and as a means of exit, upon failure of the device, for the developed gases or solid bodies or fragments to the atmosphere outside the transformer casing, so that the parts located within the casing will not be damaged.

It is, therefore, an object of my invention to provide protective equipment for electrical apparatus, such as transformers, in which an electrical discharge device of the cathode drop or auto-valve type is positioned within the casing and connected across the apparatus to be protected, thus avoiding the necessity of mounting the lightning arrester equipment on the outside of the casing and in bringing the leads from such equipment through the wall of the casing.

It is a further object of the invention to provide equipment of the character above indicated, in which the electrical discharge device is insulated from the casing by a column of insulating fluid held in position between the lightning arrester and the wall of the casing by an insulating wall or partition forming an enclosure for the insulating fluid.

It is a further object of the invention to provide for the expulsion of gases and other material from the apparatus casing 1 upon failure of the electrical discharge device 23—24 through the enclosure 19 normally containing the insulating liquid.

Other objects and advantages of the invention will be apparent from the following description of a preferred embodiment thereof, reference being had to the accompanying drawing, in which:

Figure 1 is a diagrammatic view of circuits and apparatus illustrating one embodiment of the invention; and Fig. 2 is a sectional view of a portion of the apparatus illustrating a modification in the details of construction.

Referring to the drawing, and particularly to Fig. 1, a metal case 1 is provided in which is enclosed a transformer having a core structure 2 about the winding leg of which is wound a high voltage winding 3 that is connected by conductors 4 and 5, that extend through bushings 6 and 7, to a circuit exterior to the transformer, and with a low voltage winding 8 that is connected by conductors 9 and 11, through bushings 12 and 13, to a low voltage outside circuit. A lightning arrester or electrical discharge device 14 is provided, the terminals of which are connected by conductors 15 and 16, to the conductors 4 and 5, respectively, that connect with the high voltage transformer winding 3. The discharge device 14 is shown as mounted on the lower end of a tubular member 17 formed of insulating material and extending downwardly from the cover 18 of the casing structure. A flexible diaphragm 21 is provided between the tubular member 17 and the discharge device 14 which serves as a partition between the enclosure 19 and the space within the insulating casing 25 of the discharge device 14. The tubular wall or partition 17 is attached to the discharge device 14 and to the cover 18 by any suitable means to provide a tight enclosure 19, within which liquid insulating material, such as oil or equivalent material, may be enclosed to form an insulating column between the discharge device 14 and the casing.

An aperture is formed in the casing cover 18 in registry with the enclosure 19, which is normally closed by a flexible diaphragm 22 that may be ruptured upon an increase in pressure within the enclosure, such as would result from a rapid disintegration of the oil and the formation of gases that might occur upon failure of the cathode drop discharge device, thus establishing a means of exit from the discharge device to the outside atmosphere for any materials damaged as a result of the failure of the discharge device.

The cathode drop discharge device 14 may be of a well known construction consisting essentially of a stack of high resistance bodies 23 in series, and an extinguishing spark gap 24 positioned within an insulating casing 25 and connected by conductors 15 and 16 to the apparatus to be protected. The high resistance bodies 23 may be discs that are insulated from one another by air or by mica, in such a way as to permit glow discharges therebetween but to prevent the flow of low resistance arcs. One such discharge device is disclosed in U. S. Patent No. 1,509,493, to Joseph Slepian, dated September 23, 1934, and assigned to the same assignee as this application. The gap 24 is provided to insure that after the impulse wave resulting from a lightning stroke has been impressed across the discharge device, the arc which the normal operating voltage attempts to maintain through the device is extinguished by the discharge device within one half cycle. Equivalent discharge devices, such as the auto-valve lightning arrester employing a switch gap, one or more porous blocks of high resistance material, and a quench gap in series, may likewise be employed.

Referring to Fig. 2 of the drawing, a movable cover plate 26 is illustrated in place of the rupturable diaphragm 22 of Fig. 1, which plate is normally held in position by guide bolts 27 extending upwardly from the tank cover through openings in the lid 26, that carry springs 28 beneath the heads at the upper ends of the bolts and the lid 26 to force the lid downwardly so that the rib 29 will fit into a cooperating channel 31 to close communication between the enclosure 19 and the outside atmosphere under normal operating conditions of the apparatus. Upon the generation of gases creating a pressure within the chamber 19, the lid 26 is forced upwardly against the springs 28 to the position illustrated, permitting escape of the gases to the outside atmosphere.

Modifications in the apparatus and circuits illustrated and described within the spirit of my invention will occur to those skilled in the art, and I do not wish to be limited otherwise than by the scope of the appended claims.

I claim as my invention:

1. In protective equipment for electrical apparatus comprising a winding, a metal casing for enclosing said apparatus, and a cathode drop type discharge device positioned within the casing and electrically insulated therefrom, said discharge device being connected between selected points of the winding to be protected, characterized in that the cathode drop type discharge device is positioned below the cover of the transformer casing by a supporting tube of insulating material registering with an aperture in the casing cover and containing an insulating fluid for insulating the cathode drop discharge device from the casing.

2. In protective equipment for electrical apparatus comprising a winding, a metal casing for enclosing said apparatus, and a cathode drop type discharge device positioned within the casing and electrically insulated therefrom, said discharge device being connected between selected points of the winding to be protected, said cathode drop type discharge device being supported from the casing by a housing of insulating material forming an enclosure, a body of insulating fluid within said enclosure to provide insulating means between the discharge device and the casing.

3. In protective equipment for electrical apparatus comprising a winding, a metal casing for enclosing said apparatus, and a cathode drop type discharge device positioned within the casing and electrically insulated therefrom, said discharge device being connected between selected points of the winding to be protected, said cathode drop type discharge device being supported from the casing by a housing of insulating material forming an enclosure, a body of insulating fluid within said enclosure to provide insulating means between the discharge device and the casing, said enclosure containing insulating fluid being arranged to provide, upon failure of said cathode drop type discharge device, a conduit for enabling any gases generated as a consequence of such failure to escape to the atmosphere exterior to the casing.

4. In protective equipment for electrical apparatus comprising a winding, a metal casing for enclosing said apparatus, and a cathode drop type discharge device positioned within the casing and electrically insulated therefrom, said discharge device being connected between selected points of the winding to be protected, said cathode drop type discharge device being supported from the casing by a housing of insulating material forming an enclosure, a body of insulating fluid within said enclosure to provide insulating means between the discharge device and the casing, said enclosure containing insulating fluid being arranged to provide, upon failure of said cathode drop type discharge device, a conduit for enabling any gases generated as a consequence of such failure to escape to the atmosphere exterior to the casing, and a movable outer wall for normally retaining the insulating fluid in said enclosure and adapted to move outwardly by the force of said generated gases to permit their escape.

5. In protective equipment for electrical apparatus comprising a winding, a metal casing for enclosing said apparatus, a cathode drop type discharge device positioned within the casing and supported from the cover by a tube of insulating material extending downwardly therefrom and forming an enclosure above the discharge device, a body of insulating fluid within said enclosure above the discharge device, and a movable outer wall for said enclosure substantially in the plane of the cover of the casing, said tubular structure and the enclosed insulating fluid comprising means for normally insulating the discharge device from the casing, and, upon failure of the discharge device, to provide a conduit for enabling any gases generated as a consequence of such failure to escape to the atmosphere exterior to the casing.

6. In protective equipment for electrical apparatus comprising a winding, a metal casing for enclosing said apparatus, and a cathode drop type discharge device positioned within the casing and connected across the apparatus to be protected, a wall of insulating material extending downwardly from the casing cover and supporting the discharge device at its lower end and forming an enclosure between the cover and the discharge device, a body of insulating fluid within said enclosure to provide insulating means between the discharge device and the casing and arranged to provide, upon failure of said discharge device, a conduit for enabling any gases generated as a consequence of such failure to escape to the atmosphere exterior to the casing, and a movable outer wall for normally retaining the insulating fluid in said enclosure.

7. In protective equipment for electrical apparatus comprising a winding, a metal casing for enclosing said apparatus, a cathode drop type discharge device connected across the winding turns to be protected and positioned within the casing and supported from the cover by a wall of insulating material extending downwardly therefrom and forming an enclosure below the level of the casing cover and above the discharge device, a body of insulating fluid within said enclosure above the discharge device, said enclosure having an aperture substantially in the plane of the cover of the casing and a movable lid for normally closing the aperture, said insulating wall structure and the enclosed insulating fluid comprising means for normally insulating the discharge device from the casing, and, upon failure of the discharge device, to provide a conduit for enabling any gases generated as a consequence of such failure to escape to the atmosphere exterior to the casing.

JOSEPH REBHAN.